US012593293B2

(12) United States Patent
Ashraf et al.

(10) Patent No.: US 12,593,293 B2
(45) Date of Patent: Mar. 31, 2026

(54) METHODS AND APPARATUSES FOR RECEIVER (Rx)—TRANSMITTER (Tx) ROUND TRIP TIME ESTIMATION

(71) Applicant: Nokia Technologies Oy, Espoo (FI)

(72) Inventors: Muhammad Ikram Ashraf, Espoo (FI); Thomas Haaning Jacobsen, Aalborg (DK); Zexian Li, Espoo (FI); Ryan Keating, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 340 days.

(21) Appl. No.: 18/260,552

(22) PCT Filed: Jan. 11, 2022

(86) PCT No.: PCT/IB2022/050187
§ 371 (c)(1),
(2) Date: Jul. 6, 2023

(87) PCT Pub. No.: WO2022/157598
PCT Pub. Date: Jul. 28, 2022

(65) Prior Publication Data
US 2024/0057004 A1 Feb. 15, 2024

Related U.S. Application Data

(60) Provisional application No. 63/139,476, filed on Jan. 20, 2021.

(51) Int. Cl.
*H04W 56/00* (2009.01)
*H04J 3/06* (2006.01)

(52) U.S. Cl.
CPC ....... *H04W 56/0045* (2013.01); *H04J 3/0661* (2013.01)

(58) Field of Classification Search
CPC ........... H04W 56/0045; H04W 56/009; H04W 56/0065; H04J 3/0661; H04L 43/0864;
(Continued)

(56) References Cited

U.S. PATENT DOCUMENTS 9,955,446 B2 4/2018 Zhang et al.
2011/0250844 A1* 10/2011 Gorday ................ H04B 17/364
455/67.14
(Continued)

FOREIGN PATENT DOCUMENTS

WO 2016/010899 A1 1/2016
WO 2020/092399 A1 5/2020
WO 2022/043092 A1 3/2022

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
(Continued)

*Primary Examiner* — Ricardo H Castaneyra
(74) *Attorney, Agent, or Firm* — Carter, DeLuca & Farrell LLP

(57) ABSTRACT

Systems, methods, apparatuses, and computer program products for Rx-Tx RTT estimation are provided. One method may include transmitting, by a network element, the reference signal to another network element and recording a time stamp (t0) of a time of transmission of the reference signal, and receiving an estimated Rx-Tx measurement from said another network element and recording a time stamp (t3) of a time of receipt of the estimated Rx-Tx measurement. The method may also include calculating a Rx-Tx measurement at the network element based on a difference between the time stamp (t0) of the time of transmission of the reference signal and the time stamp (t3) of the receipt of
(Continued)

the estimated Rx-Tx measurement, and determining a propagation delay based on a difference between the received estimated Rx-Tx measurement and the calculated Rx-Tx measurement.

3 Claims, 8 Drawing Sheets

(58) Field of Classification Search
  CPC ............. H04L 27/2646; H04L 27/2665; H04L 27/2675
  USPC ................................. 370/329, 252, 350, 503
  See application file for complete search history.

(56) References Cited

U.S. PATENT DOCUMENTS

| | | | | |
|---|---|---|---|---|
| 2012/0106380 | A1* | 5/2012 | Vaidyanathan ........... | G01S 5/14 370/252 |
| 2012/0289178 | A1* | 11/2012 | Matsumura ....... | H04W 52/0206 455/403 |
| 2016/0081054 | A1* | 3/2016 | Zhang ..................... | G01S 13/74 370/252 |
| 2019/0191429 | A1* | 6/2019 | Stern-Berkowitz ... | H04W 72/21 |
| 2020/0137607 | A1* | 4/2020 | Akkarakaran ........ | G01S 5/0215 |

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.

"3rd Generation Partnership Project; Technical Specification Group Radio Access Network; NR; Physical layer procedures for data (Release 16)", 3GPP TS 38.214, V16.3.0, Sep. 2020, pp. 1-166.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"Revised WID: Enhanced Industrial Internet of Things (IOT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.

"Summary#1 of email discussion [102-e-NR-HIOT_URLLC_enh-05]", 3GPP TSG RAN WG1 Meeting #102-e, R1-2007068, Agenda: 8.3.4, Huawei, Aug. 17-28, 2020, 52 pages.

"Discussion on enhancements for propagation delay compensation", 3GPP TSG RAN WG1 #103-e, R1-2008844, Agenda: 8.3.4, Nokia, Oct. 26-Nov. 13, 2020, 9 pages.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.2.0, Sep. 2020, pp. 1-117.

"LS on NR Positioning gNB measurement report range and granularity", 3GPP TSG-RAN WG4 Meeting # 94-e-Bis, R4-2005841, RAN4, Apr. 20-30, 2020, 2 pages.

"Discussion on enhancements for support of propagation delay compensation for accurate time synchronization", 3GPP TSG RAN WG2 #111-e, R2-2006922, Agenda: 8.5.2, Nokia, Aug. 17-28, 2020, 8 pages.

International Search Report and Written Opinion received for corresponding Patent Cooperation Treaty Application No. PCT/IB2022/050187, dated Mar. 29, 2022, 11 pages.

* cited by examiner

800 — Preparing a reference signal

805 — Transmitting the reference signal and recording a time stamp of the time of transmission of the reference signal 810 — Receiving an estimated Rx-Tx measurement 815 — Calculating a Rx-Tx measurement 820 — Determining a PD 825 — Applying the determined PD as an offset to adjust SFN time 850 — Receiving a reference signal and recording the time of receipt of the reference signal 855 — Predicting a transmit time 860 — Estimating Rx-Tx measurement 865 — Transmitting the estimated Rx-Tx measurement

METHODS AND APPARATUSES FOR RECEIVER (Rx)—TRANSMITTER (Tx) ROUND TRIP TIME ESTIMATION

RELATED APPLICATION

This application claims priority to PCT Application No. PCT/IB2022/050187, filed on Jan. 11, 2022, which claims priority to U.S. Provisional Application No. 63/139,476, filed on Jan. 20, 2021, each of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for receiver (Rx)-transmitter (Tx) round trip time (RTT) estimation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method that includes transmitting, by a network element, a signal to another network element and recording a time stamp (t0) of a time of transmission of the signal, receiving an estimated Rx-Tx measurement from said another network element and recording a time stamp (t3) of a time of receipt of the estimated Rx-Tx measurement, calculating a Rx-Tx measurement at the network element based on a difference between the time stamp (t0) of the time of transmission of the signal and the time stamp (t3) of the receipt of the estimated Rx-Tx measurement, and determining a propagation delay based on a difference between the received estimated Rx-Tx measurement and the calculated Rx-Tx measurement.

An embodiment may be directed to a method that includes receiving, at a network element, a signal from another network element and recording a time of receipt (t1) of the signal, predicting, by the network element, a transmit time based on at least one of allocated resources, applied difference between downlink to uplink transmission timing, or internal errors at the network element, estimating Rx-Tx measurement based on a difference between the time of receipt and the predicted transmit time, and transmitting the estimated Rx-Tx measurement to said another network element.

An embodiment may be directed to an apparatus that includes at least one processor and at least one memory comprising computer program code. The at least one memory and computer program code configured, with the at least one processor, to cause the apparatus at least to: transmit a signal to a network element and record a time stamp (t0) of a time of transmission of the signal, receive an estimated receiver-transmitter (Rx-Tx) measurement from said network element and record a time stamp (t3) of a time of receipt of the estimated Rx-Tx measurement, calculate a Rx-Tx measurement based on a difference between the time stamp (t0) of the time of transmission of the signal and the time stamp (t3) of the receipt of the estimated Rx-Tx measurement, and determine a propagation delay based on a difference between the received estimated Rx-Tx measurement and the calculated Rx-Tx measurement.

An embodiment may be directed to an apparatus that includes at least one processor and at least one memory comprising computer program code. The at least one memory and computer program code configured, with the at least one processor, to cause the apparatus at least to: receive a signal from a network element and recording a time of receipt (t1) of the signal, predict a transmit time based on at least one of allocated resources, applied difference between downlink to uplink transmission timing, or internal errors at the apparatus, estimate receiver-transmitter (Rx-Tx) measurement based on a difference between the time of receipt and the predicted transmit time, and transmit the estimated Rx-Tx measurement to said network element.

An embodiment may be directed to an apparatus that includes means for transmitting a signal to a network element and record a time stamp (t0) of a time of transmission of the signal, means for receiving an estimated receiver-transmitter (Rx-Tx) measurement from said network element and means for recording a time stamp (t3) of a time of receipt of the estimated Rx-Tx measurement, means for calculating a Rx-Tx measurement based on a difference between the time stamp (t0) of the time of transmission of the signal and the time stamp (t3) of the receipt of the estimated Rx-Tx measurement, and means for determining a propagation delay based on a difference between the received estimated Rx-Tx measurement and the calculated Rx-Tx measurement.

An embodiment may be directed to an apparatus that includes means for receiving a signal from a network element and means for recording a time of receipt (t1) of the signal, means for predicting a transmit time based on at least one of allocated resources, applied difference between downlink to uplink transmission timing, or internal errors at the apparatus, means for estimating receiver-transmitter (Rx-Tx) measurement based on a difference between the time of receipt and the predicted transmit time, and means for transmitting the estimated Rx-Tx measurement to said network element.

BRIEF DESCRIPTION OF THE DRAWINGS

For proper understanding of example embodiments, reference should be made to the accompanying drawings, wherein.

DETAILED DESCRIPTION

Figure 1:
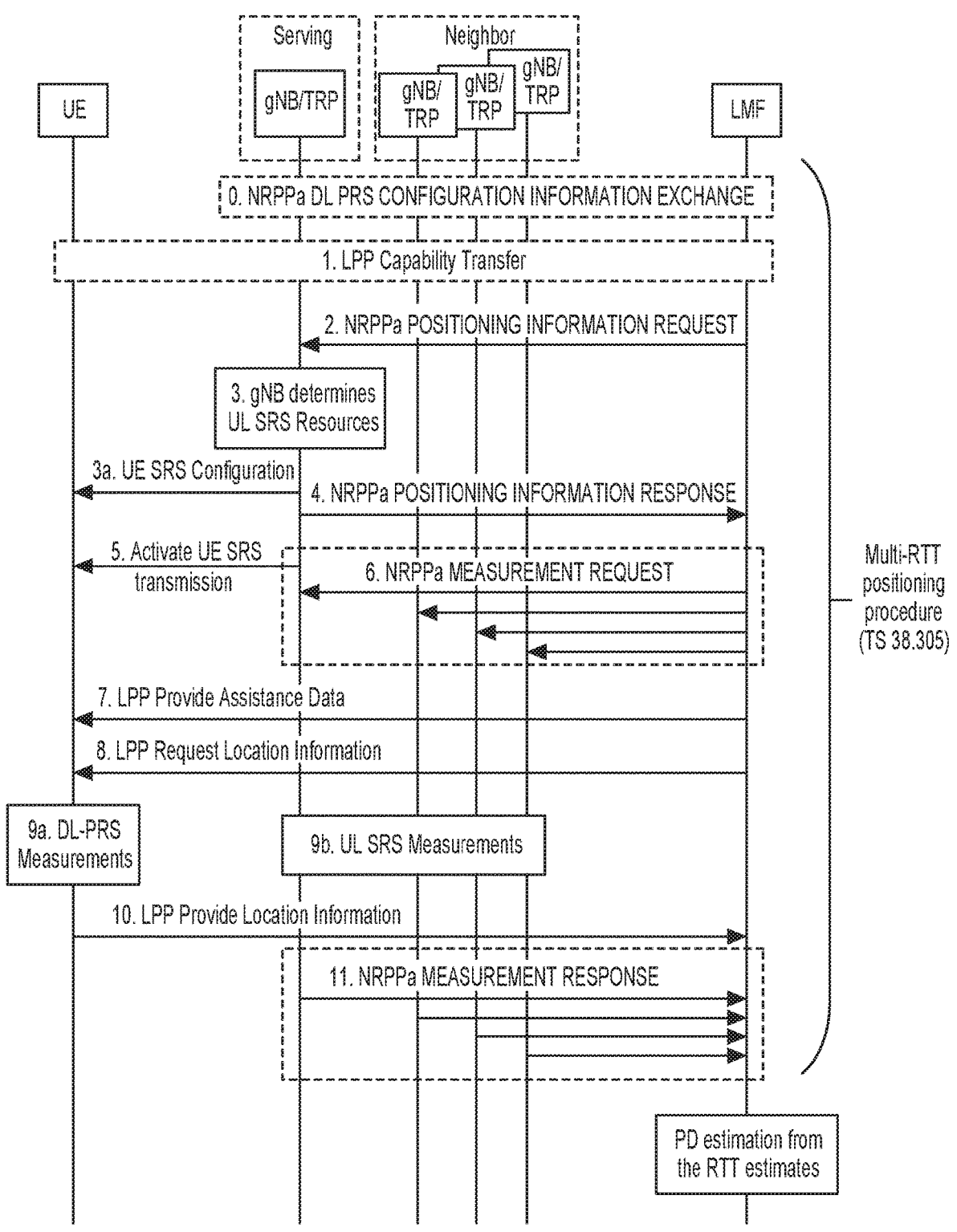
FIG. 1 illustrates an example signaling diagram of a multi-round trip time (RTT) procedure.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for Rx-Tx RTT estimation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

As will be discussed in detail herein, certain example embodiments may provide a framework for reduced Rx-Tx measurement signaling.

Accurate time synchronization was introduced in Release-16 of the $3^{rd}$ generation partnership project (3GPP) 5G new radio (NR) specifications in order to support Industrial IoT (IIoT) use cases, for example, to support time sensitive networking (TSN) or time sensitive communications (TSC) applications. Time synchronization can ensure that different nodes of a 5G network (e.g. a user plane function (UPF), gNB, UE, etc.) share the same time of day (ToD) clock, such as coordinated universal time (UTC) clock. The work on time synchronization continues in Release-17 where possible objectives related to time synchronization includes RAN impacts on uplink time synchronization for TSN and propagation delay compensation enhancements including mobility issues, if any. It is widely envisioned that further enhancements on time synchronization will be continued in the coming release(s) as well.

Some additional ongoing objectives include identifying the time synchronization accuracy budget per Uu interface, and identifying and evaluating the achievable accuracy of propagation delay estimation techniques. The following options for propagation delay compensation are being evaluated: timing advance (TA) based propagation delay (option 1) and round trip time (RTT) based delay compensation (option 2). The TA-based propagation delay (option 1) may include: propagation delay estimation based on timing advance potentially with enhanced TA indication granularity (option 1*a*); propagation delay estimation based on timing advanced enhanced for time synchronization (option 1*b*), as option 1*a* but with updated requirements to TA adjustment error and Te; and propagation delay estimation based on a new dedicated signaling with finer delay estimation and compensation granularity with separated signaling from TA so that the TA procedure is not affected (option 1*c*). The RTT based delay compensation (option 2) may include propagation delay estimation based on a RAN managed Rx-Tx procedure intended for time synchronization (with the possibility to expand the procedure/signaling specified for positioning or separate/dedicated procedure/signaling).

Due to the dynamic nature of the radio link, it may be challenging to deliver time synchronization over Uu interface from a gNB to a UE. Using the 5G NR control plane, time synchronization information (e.g., gNB clock) can be delivered from a gNB to served UEs using two methods. One is a broadcast method where the time information is encoded in a system information block 9 (SIB9) message for example. The other is a unicast method where the time information is encoded in a unicast RRC message as one example. In both methods, the encoded time information is the gNB's clock time that corresponds to the ending boundary of a specific radio system frame (e.g. refSFN), where the refSFN is indicated to the UE either implicitly (in case of broadcast) or explicitly (in case of unicast). When a UE receives the SIB9/RRC message, it associates the time information with its own refSFN boundary, which is aligned with the gNB's refSFN boundary. In this way, underlying 5G radio frame timing at a gNB and UE can be used as a common reference for delivery of ToD clock.

A challenge in using the underlying 5G radio frame timing at a gNB and UE as a common reference for deliverying of ToD clock is that radio frame boundaries (hence refSFN boundaries) at a gNB and UE are not perfectly aligned in time with respect to one another. Downlink frame boundary at UE side is shifted by the propagation delay (i.e., by the time it takes for radio frame to propagate from gNB to UE over the air) with respect to the corresponding frame boundary at the gNB. When a UE synchronizes its clock by associating the time information carried by SIB9/RRC message with its own refSFN boundary, its clock will be delayed by propagation delay compared to the gNB's clock. This is not an issue if the Uu interface budget is sufficiently large, compared to the maximum experienced propagation delay. For small indoor scenarios, the propagation delay might not be an issue (as 10 m adds 33 ns), but for larger cells, such as a smart grid scenario, or for a very tight Uu interface requirement (i.e., <300 ns which can be agreed in Release-17 or can be introduced in Release-18), the UE may need to compensate the time information received in SIB9/RRC message for the propagation delay (PD), e.g., by adding its current PD estimate to the time information.

Acquisition of a PD estimation uses a measurement of the propagation delay, typically estimated from a RTT measurement assuming symmetric downlink (DL)/uplink (UL) links This can be obtained using the positioning framework (multi-RTT measurements) or through the UE TA mechanism. Both procedures are reflected as option 2 and option 1, respectively, as introduced above. The approximate estimation of the DL or UL propagation delay from an RTT estimation is RTT/2.

A benefit of option 1 (TA based) over option 2 (Rx-Tx based) propagation delay estimation is that TA is a mandatory feature which is required for all UEs. Therefore, it may be assumed that TA will not be removed, although option 2 will be specified to be used for propagation delay estimation. Option 2 has a benefit over Option 1 in that it is not tied to requirements designed to ensure that the UE UL transmission time can be adjusted to be within the cyclic prefix duration. This also means that option 2 can provide a higher propagation delay estimation accuracy, when compared to option 1.

It is noted that the discussion provided above is based partly on the assumption that the current Rx-Tx procedure, which is currently only for positioning purposes in the multi-RTT framework is specified in a single-cell RAN-centric procedure.

FIG. 1 illustrates an example signaling diagram of a multi-RTT procedure in positioning framework as specified in 3GPP TS 38.305, according to one example. As illustrated in the example of FIG. 1, at step 0, a NR positioning protocol A (NRPPa) DL positioning reference signal (PRS) configuration information exchange may occur between, for example, a serving gNB/transmission-reception point (TRP), neighboring gNB(s)/TRPs, and a location management function (LMF). At step 1, a LTE positioning protocol (LPP) capability transfer may occur with a UE. The LMF may transmit, at step 2, a NRPPa positioning information request. At step 3, the gNB/TRP may determine UL sounding reference signal (SRS) resources and, at step 3a, provide the SRS configuration to the UE. At step 4, the gNB/TRP may provide a NRPPa positioning information response to the LMF. Then, at step 5, the gNB/TRP may activate UE SRS transmission. The LMF may send, at step 6, a NRPPa measurement request to the gNB/TRP and, at steps 7 and 8, may provide LPP assistance data and request LPP location information to the UE. At step 9a, the UE may perform DL PRS measurements and, at step 9b, the gNB(s)/TRP(s) may perform UL SRS measurements. The LMF may receive from the UE, at step 10, LPP location information and, at step 11, NRPPa measurement response from the gNB(s)/TRP(s). The LMF may then perform PD estimation from the RTT estimates.

As can be seen from the example of FIG. 1, DL-based positioning can be supported by PRS. Compared with LTE, the PRS has a more regular structure and a much larger bandwidth, which allows for a more precise correlation and time of arrival (ToA) estimation. The LMF collects measurements and then estimates the location of the UE. The UE can then report the ToA difference for PRSs received from multiple distinct base stations, and the LMF can use the reports to determine the position of the UE.

UL-based positioning is based on Release-15 sounding reference signals (SRSs) with Release-16 extensions. Based on the received SRSs, the base stations can measure and report (to the LMF) the relative arrival time, the received power and the angle of arrival from which the position of the UE can be estimated. The time difference between DL reception and UL transmission can also be reported and used in the multi-RTT based scheme, where the distance between a base station and a UE can be determined based on the estimated RTT. By several such RTT measurements involving different base stations, the UE position can be determined.

More specifically, the UE/gNB timing measurement which are DL-RSTD, the UE Rx-Tx time difference, UL RTOA (UL Relative Time of Arrival), and gNB Rx-Tx time difference can be used to calculate the position of a UE and can be utilized for gNB-UE time synchronization purposes. The reporting granularity for UE/gNB measurement is defined as $T=T_c 2^k$, where $k=\{0,1,2, \ldots, 5\}$ is a configuration parameter with a minimum value of 0.

It is noted that certain example embodiments described herein may relate to a problem with a single-cell Rx-Tx based RTT estimation procedure running at the gNB, but are not limited thereto.

Figures 2, 3:
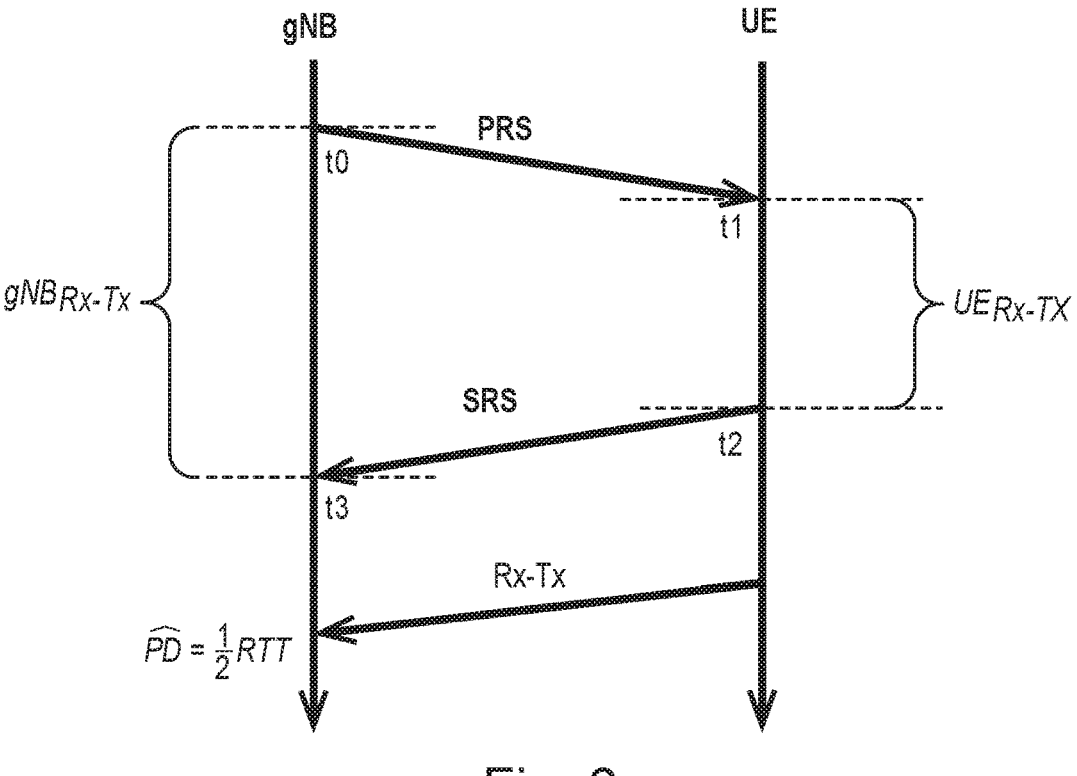
FIG. 2 illustrates an example of a RTT procedure used for propagation delay (PD) compensation.
FIG. 3 illustrates an example of an enhanced RTT procedure for PD compensation, according to an embodiment.

Typically, RTT can be performed using three signals: (1) DL reference signal such as PRS, (2) UL reference signal such as SRS, and (3) Rx-Tx measurement reporting as illustrated in the example of FIG. 2. As illustrated in the example of FIG. 2, a gNB may signal PRS to a UE, and the SRS and/or Rx-Tx measurement from the UE is signalled to the gNB. However, some problems may arise with this procedure. For example, the over-the-air (OTA) signals are costly and, therefore, it is desirable to use as little as possible signals to reduce at least overhead and increase the efficiency. For a single Rx-Tx based PD estimation, at least one UL and one DL reference signal is needed. Also, additional resources are needed, on top of the resources needed for reference signals transmission, for reporting the measurements.

In view of the above, certain example embodiments may be configured to reduce the cost of the Rx-Tx based RTT estimation procedure, such as by reducing signalling overhead for the RTT procedure, without compromising the RTT accuracy.

Some example embodiments provide a Rx-Tx RTT estimation procedure with reduced signaling, e.g., utilizing just two signals (instead of 3). According to certain embodiments, a UE is configured to predict its transmission time and, after having determined the reception time of the DL reference signal (e.g., PRS), the UE can compute the Rx-Tx measurement report, then send the reference signal and the Rx-Tx measurement report in the same transmission. As a result, instead of separately sending the reference signal (e.g., SRS) and Rx-Tx measurement message, an embodiment can combine the reference signal and the Rx-Tx measurement value in a single transmission. This may be achieved, for example, by sending a shared channel, such as for example, a physical uplink shared channel (PUSCH), with the predicted Rx-Tx measurement. In an example embodiment, the shared channel may be sent along with a reference signal, such as a demodulation reference signal (DM-RS). It is noted that, although shared channel is used here, the resource can be shared by multiple UEs or dedicated to one UE only.

FIG. 3 illustrates an example signaling diagram of a RTT based propagation delay estimation procedure for PD compensation, according to an embodiment. It should be noted that, according to certain embodiments, the procedure depicted in the example of FIG. 3 can be reversible between the gNB and the UE.

As illustrated in the example of FIG. 3, the gNB may prepare the DL reference signal and may record the time stamp, t0, and transmit the reference signal to the UE at the recorded time. For example, the transmitted reference signal may be PRS, as shown in the example of FIG. 3, but it could also be other signals for example primary synchronization signal (PSS) in a synchronization signal/physical broadcast channel (PBCH) block (SSB) or DM-RS in a PDSCH or even a specific DL message.

As further illustrated in the example of FIG. 3, the UE may receive the DL reference signal and record the reception time, which is shown as t1 in the example of FIG. 3. The UE may then predict the transmit timing, t2. To do so, the UE may consider the allocated resources, applied difference between DL to UL transmission timing, and/or UE internal timing errors resulting from, for example, UE clock drift. Based on the detection time t1 and estimated transmission time t2, the UE may calculate the estimated $\widehat{Rx-Tx}$ measurement by (t2–t1).

Next, as shown in the example of FIG. 3, the UE may transmit a shared channel, such as for example, PUSCH with DM-RS, towards the gNB. The transmitted UL signal may contain the estimated $\widehat{Rx-Tx}$, for example, as a new medium access control (MAC) control element (CE). The gNB may detect the subframe and record the reception time stamp t3 (based on the PUSCH with DM-RS). Based on the available time stamps t0 and t3, the gNB can calculate Rx-Tx as (t3–t0). As the gNB has all necessary parameter values required to calculate the propagation delay (PD) which is ½ of the downlink and uplink Rx-Tx differences at gNB and UE. Afterward, the gNB may apply the PD compensation value as the offset to adjust its system frame number (SFN) boundary timestamp.

Further example embodiments may include additional or alternative options, such as signaling delta Rx-Tx or/and intra-symbol offset on a shared channel, such as for example, PUSCH, using a reference signal, such as for example, DM-RS, to signal delta Rx-Tx or/and intra-symbol offset, a correction method for the estimated Rx-Tx, and a flexible PD estimation driven by UE or gNB. In some embodiments, the above-mentioned options may be configured by the gNB.

Figure 4:
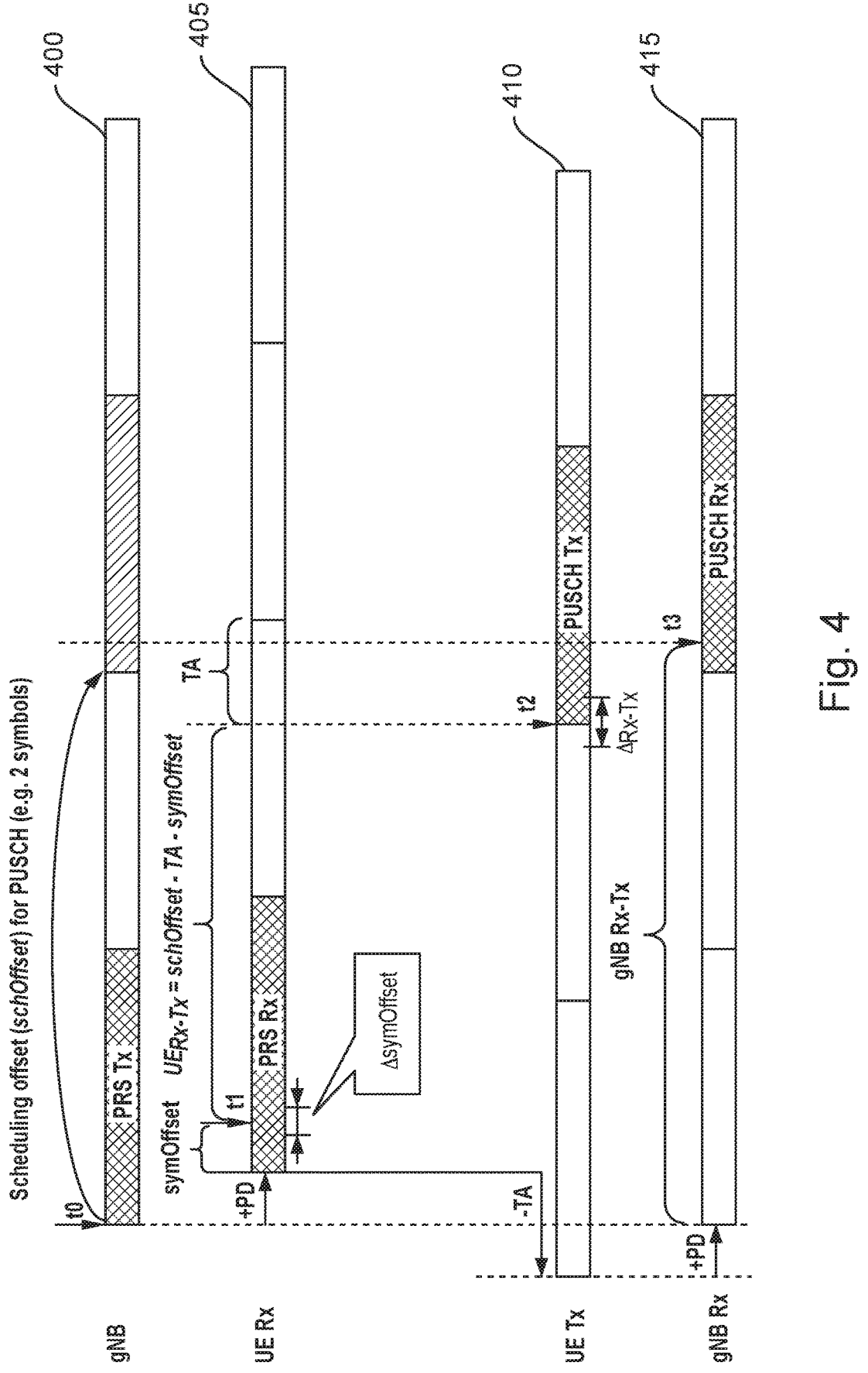
FIG. 4 illustrates an example diagram of a timeline for reception time of a reference signal and a transmission time on an uplink channel, according to an embodiment.

In order to estimate the Rx-Tx measurement, certain components may be involved in the Rx-Tx measurement including the elements to be considered when predicting the Tx timestamp, t2. FIG. 4 illustrates an example diagram depicting the timings involved in an Rx-Tx measurement. In the example of FIG. 4, the top timeline 400 denotes the gNB DL (in this example, the timeline duration is four symbols). The second line 405 illustrates the UE DL reception time, which may correspond to the gNB DL transmit timing plus the propagation delay of the DL channel. The third timeline 410 is the UE UL transmission time which corresponds to the DL reception time minus the timing advance value. The last line 415 may correspond to the gNB UL reception time, which may be aligned with the gNB DL transmission time. As illustrated in the example of FIG. 4, the PRS is transmitted in the first symbol. In the example of FIG. 4, the transmission time corresponds to timestamp t0 and the reception time at the UE corresponds to timestamp, t1. It is noted that the start of the symbol of receiving the PRS and the identified first path of arrival of PRS might not be exactly the same, e.g., the symbol boundary is adjusted on a slow basis or there is an intentional offset that applies (within the timing advance performance requirements). This offset may be denoted as the intra-symbol offset (also denoted symOffset). Then, the UE may be scheduled to transmit the Rx-Tx measurement two symbols later. The transmission time of this is denoted t2 and the reception time of this is denoted, t3.

In order to transmit the estimated Rx-Tx measurement, the UE may need to predict the Tx timestamp t2 sufficiently early to have the Rx-Tx measurement encoded and included for transmission. So, the UE may determine when it needs to predict t2, such that it has time for processing at different protocol layers, for example MAC and PHY layer, and then may attempt to predict the actual t2 timestamp at this early time instance—this could include, for example, UE clock drift and UE DL symbol boundary change.

In an embodiment, the prediction error of the predicted Tx timestamp $\widehat{t2}$ can be denoted as $TE_{E_{\widehat{t2}-t2}}=TE_{UE-DL-RX}+TE_{clock-drift}$, where the $TE_{UE-DL-RX}$ is the change of the DL Rx frame timing difference between the predicted DL Rx frame timing at $\widehat{t2}$ and actual timestamp t2 and the $TE_{clock-drift}$ is the UE internal uncompensated clock drift between the predicted Tx timestamp $\widehat{t2}$ and the actual Tx timestamp t2. The magnitude of the internal clock drift requires that the UE must predict timestamp t2 relative to the actual timestamp t2 in advance. It is estimated that a conventional UE needs less than 5 ms to prepare PUSCH transmission. In this period of time, a UE with a poor clock performance (e.g., a conventional UE hold over capability of 0.3 ppm/s) will drift result in 30 ns/100 ms or 1.5 ns per 5 ms. The change in DL frame timing can be due to this clock drift or due to the UE actual moving and not having predicted this in advance. A worst case of this can be, for example, the UE moving 200 km/h directly towards or away from the gNB, which means 18.5 ns/100 ms or 0.925 ns per 5 ms. A regular UE without decent clock performance and without prediction of DL frame timing change (i.e., fixing the DL frame timing in 5 ms) will have a worst estimation error of t2 which can be in the order of 2.5 ns. In terms of time synchronization performance, this may be good, but in terms of positioning use case this corresponds to ~10 m error. A UE designed to provide location service is expected to have a much strict requirement on clock drift and should be able to compensate for the UE movement, or at least should perform much better than the worst-case estimation.

In an embodiment, the predicted Rx-Tx measurement can be expressed as $\widehat{Rx-Tx}=\widehat{t2}-t1=schOffset-TA-symOffset$. In certain embodiments, the full Rx-Tx measurement may be signalled (typically in the multiple symbols range), whereas in other embodiments the symOffset may be signalled (typically in the ns range). In further embodiments, both options can be supported. The PUSCH resource can be allocated to UE in the form of either configured grant (CG) or dynamic grant (DG) manner or even both.

As will be discussed in more detail below, certain embodiments may provide different notions to represent the predicted Rx-Tx measurement, as well as different options for carrying it to the gNB.

In one embodiment, delta Rx-Tx may be signalled with a shared channel such as for example, PUSCH. The delta Rx-Tx may refer to the difference between different Rx-Tx estimations, such as, but not limited to, the difference between two consecutive estimations. According to this embodiment, extra signalling can be saved for tracking the delta Rx-Tx. PUSCH may be used to represent the delta tracking by calculating the difference in estimated Rx-Tx. In one embodiment, a threshold can be configured in a static or semi-static way or indicated dynamically by a gNB. Only if the change in estimated Rx-Tx is above the possible indication range of delta Rx-Tx (i.e., the threshold), then PUSCH can be used to carry the delta Rx-Tx.

As an example, $t2'_{Rx\text{-}Tx}$ may be considered to be the newest value of Rx-Tx at time instance t2', and $t2_{Rx\text{-}Tx}$ may be considered to the Rx-Tx value at the previous time instance t2. Then, the difference between Rx-Tx values lies between the range of $\Delta_{Rx\text{-}Tx} = t2'_{Rx\text{-}Tx} - t2_{Rx\text{-}Tx}$ with the threshold $Thr_{\Delta Rx\text{-}Tx}$ such that threshold can be configured by gNB. The threshold may be used to control the PUSCH signalling, for example, such that: If $\Delta_{Rx\text{-}Tx} < Thr_{\Delta Rx\text{-}Tx}$ no PUSCH transmission (i.e., no reporting) is needed, and otherwise PUSCH is used to carry the delta Rx-Tx value.

In an embodiment, the threshold $Thr_{AsymOffset}$ can be configured by gNB, e.g., by RRC. An advantage of configuring this threshold is to save the uplink resources by minimizing PUSCH transmissions. In another embodiment, the threshold $Thr_{AsymOffset}$ can be dynamically indicated by a gNB, e.g., by downlink control information (DCI) or MAC control element (CE).

In another embodiment, intra-symbol offset may be signalled on a shared channel such as for example, PUSCH. Intra-symbol offset may represent the reception error at the UE, as shown in the example of FIG. 4. As discussed above, a gNB may already be aware of the scheduling instance and TA value for UE, but the only missing part being the intra-symbol offset value. Hence, the UE just needs to report the intra-symbol offset value by using the PUSCH. Moreover, the delta of intra-symbol offsets can also be reported (following the same or similar approach as discussed above) such that $\Delta symOffset = t2'_{symOffset} - t2_{symOffset}$ with threshold.

In another embodiment, a reference signal such as for example, DM-RS, may be used to signal delta Rx-Tx or/and intra-symbol offset. As discussed above with respect to certain example embodiments, PUSCH may be used to carry delta Rx-Tx and/or intra-symbol offset. This embodiment can provide another alternative to efficiently utilize PUSCH resources by exploiting that the UE may have more than one DM-RS sequence available to be multiplexed with its PUSCH transmission (used for channel estimation to demodulate the PUSCH data symbols). The gNB may configure the UE with multiple DM-RS sequences which may be used for reporting Rx-Tx measurement and/or the delta value $\Delta_v$ of the Rx-Tx measurement (e.g., represented as the intra symbol offset). The delta value $\Delta_v$ can be negative or positive. Therefore, in certain embodiments, the delta value can be reported in at least two ways: (i) configure maximum and minimum value, or (ii) configure maximum value, the number of DM-RS sequences and/or the corresponding granularity G. The gNB may configure the UE with a number of DM-RS sequences $N_{DMRS}$ and the maximum value; then it can determine the granularity $$G = \frac{|max\Delta_v - min\Delta_v|}{N_{DMRS}}$$

if min $\Delta_v = 0$ then $$G = \frac{|max\Delta_v|}{N_{DMRS}}.$$

The DM-RS sequences may be used to represent ±ns steps which could be used to track the delta value over time.

Figure 5:
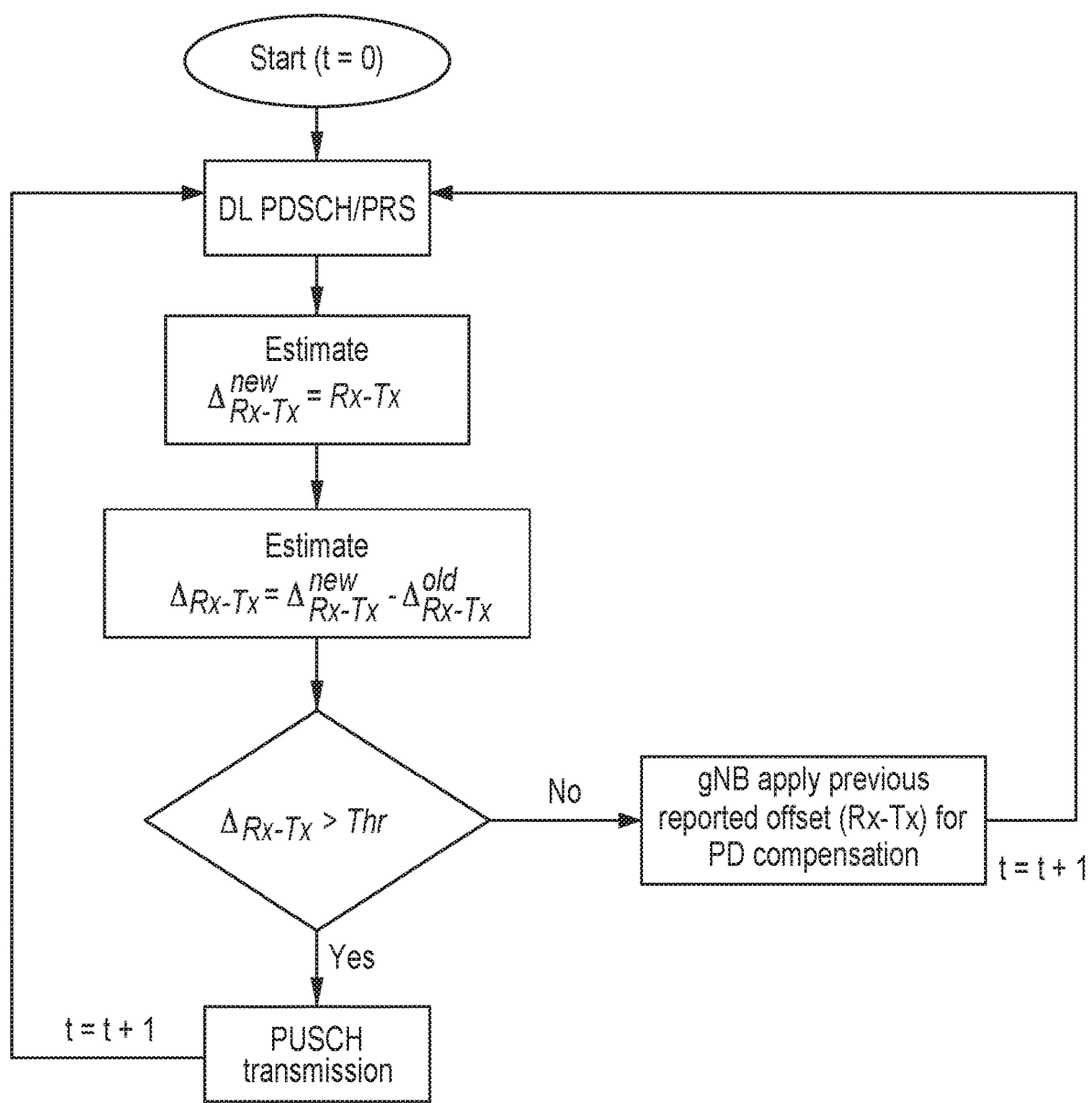
FIG. 5 illustrates an example flow chart of a method, according to an embodiment.

According to an embodiment, if the change in delta value is above the possible indication range of DM-RS, then PUSCH may be used to carry the value of Rx-Tx or the delta value. FIG. 5 illustrates an example flow chart of a process for the implicit Rx-Tx delta tracking mechanism for the PD compensation. Initially, at time t2 when t2' is not available, PUSCH may be used for transmission of Rx-Tx value. This is intended to occur, for example, when the UE has already exchanged data with gNB (i.e., with PUSCH allocation). In this case, a specific DM-RS sequence can be used to inform gNB about the Rx-Tx estimation. If $\Delta_{Rx\text{-}Tx} = 0$, then the default sequence may be used for the transmission. If $\Delta_{Rx\text{-}Tx} > Thr$, then PUSCH may be used for the transmission of Rx-Tx value. The Thr threshold may be configured by the network such that the UE then reports a new Rx-Tx using PUSCH if that threshold is crossed. If $\Delta_{Rx\text{-}Tx} < Thr$ does not satisfy the Thr condition, then UE does not transmit anything. At the gNB a timer can be used to estimate the reception of uplink transmission from UE. Upon expiration of timer, if the gNB does not receive anything, then the gNB may utilize the previous latest received value of Rx-Tx for PD estimation. An advantage of this approach is that it is a proactive approach and it can save PUSCH resources, e.g., especially suitable for the case if the received Rx-Tx value is only changing very slowly.

Figure 6:
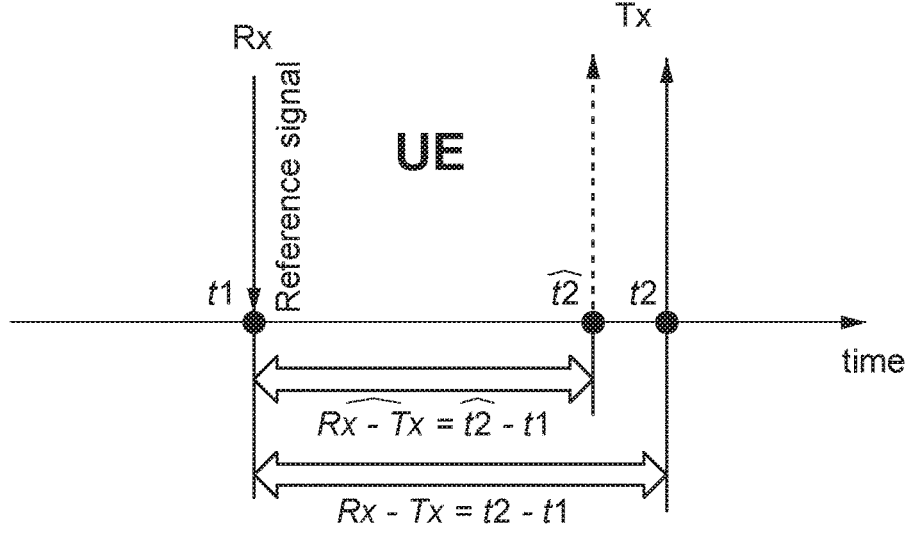
FIG. 6 illustrates an example of an estimated and actual value of Rx-Tx measurement at a UE, according to an embodiment.

Another embodiment may provide a correction method for the estimated Rx-Tx. The UE can predict the t2 time and construct the estimated Rx-Tx measurement. However, the UE can also measure the actual value of Rx-Tx considering actual transmission of PUSCH. Therefore, the UE can have both estimated value of Rx-Tx and the actual value of Rx-Tx as depicted in the example of FIG. 6. If there is error between the estimated and actual value of Rx-Tx, it is also possible that UE can send the correction to the gNB. The UE may also do so in the next PUSCH, for example, with MAC-CE or reporting by RRC signalling.

In certain example embodiments, PD compensation may be driven by gNB. As discussed above, a UE can also initiate the Tx time and the gNB may transmit the value of Rx-Tx for example in PDSCH along with the DL reference signal. This approach may utilize an aperiodic reference signal or at least a signal including a reference signal and data, such as DM-RS and PDSCH.

Certain embodiments may provide an approach using two frames for estimation of the Rx-Tx which may be given by:

$$TE_{\widehat{PD}} = \frac{1}{2}(TE_{gNB-UL-RX} + TE_{UE-UL-TX} + TE_{UE-DL-RX} + TE_{gNB-DL-TX} + TE_{\widehat{t2}-t2}) + TE_{RX-TX}$$

Figure 7:
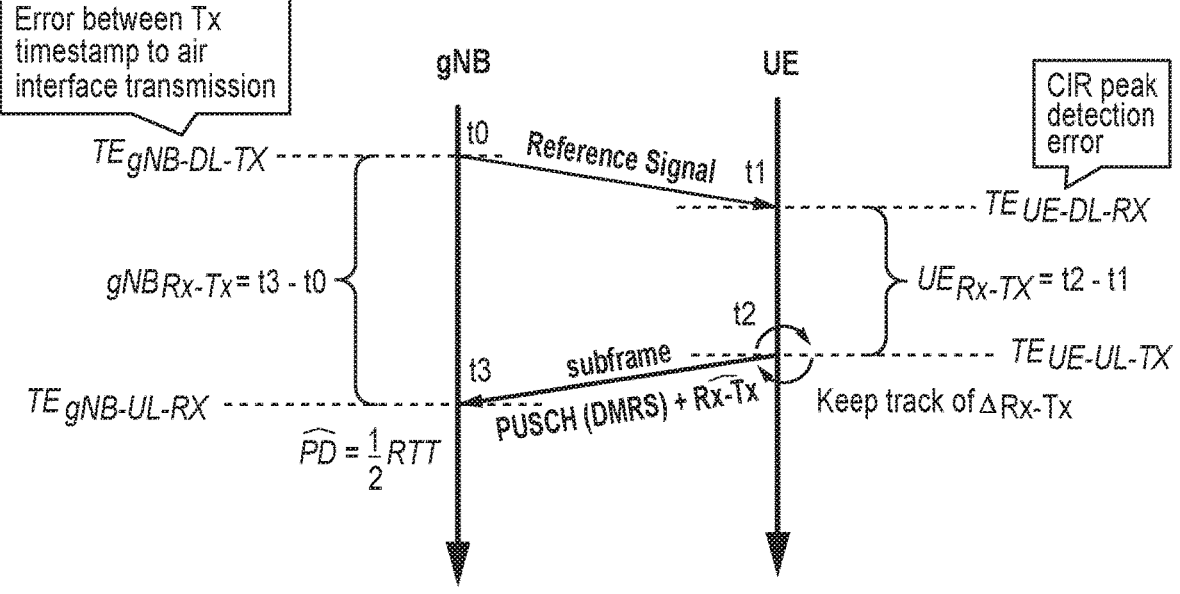
FIG. 7 illustrates an example of a Rx-Tx estimation for PD compensation, according to an embodiment.

According to certain embodiments, by combining the UL reference signal and Rx-Tx measurement into a single transmission the UL transmission error can be eliminated. The error at the UE side may include a timestamp for transmission, which may include preparation of the frame, coding and the transmission at air interface. FIG. 7 illustrates an example of the different error components for the Rx-Tx estimation for PD compensation, according to an embodiment.

As illustrated in the example of FIG. 7, for UE UL transmission timing error ($\text{TE}_{UE-UL-TX}$), in order for the UE to estimate t2, it may need to have knowledge of offset, scheduling time and TA value. Scheduling time can be estimated since the UE already has knowledge of PUSCH resource, which is going to be used for uplink transmission. There are two ways to obtain the value of offset as presented in the example of FIG. 7. The information of resources can be read from DCI and TA can be predicated or signaled from gNB (this option is applicable if TA and scheduling offset does not change).

Additionally, a proper UE implementation can also help to eliminate overhead and provide better estimation to achieve decent performance Furthermore, if the signaling is reversed (e.g., gNB predicts time instance t2), then this error can be assumed as negligible.

The UE DL reception timing error ($\text{TE}_{UE-DL-RX}$) is related to the impact from small scale fading to the peak detection (which is affected by the channel impulse response (CIR) peak detection and time sampling granularity) of the DL reference signal used by the UE to determine the SFN boundary reception time. The DL reference signal can be, for example, PSS/SSS or DM-RS on PBCH, or a dedicated DM-RS transmission on PDSCH, or even DL-PRS.

The gNB UL reception timing error ($\text{TE}_{gNB-UL-RX}$) refers to the error introduced from detection imperfection (CIR peak detection and time sampling granularity), of the uplink transmission used to measure timing offset (TO) at the gNB. For timing advance, SRS, PUCCH and PUSCH transmissions can be used to measure TO, as the UE apply TA on these.

The UE transmission estimation error ($\text{TE}_{\widehat{t2}-t2}$) is the potential mismatch between the estimated transmission time $\widehat{t2}$ and actual transmission time t2 which is given by $\text{TE}_{\widehat{t2}-t2}=\widehat{t2}-t2$. The gNB DL transmission timing error ($\text{TE}_{gNB-DL-TX}$) is the potential mismatch between the gNB transmitter internal timestamp and the actual transmission start at the air interface.

With respect to the RX-TX granularity error ($\text{TE}_{Rx-Tx}$), the reporting granularity for the UE/gNB Rx-Tx measurements can be configured by the gNB. For instance, this may be related to absolute Rx-Tx reporting granularity which is given by: $T_{Rx-Tx}=T_c*2^k$, k=[0,1, . . . ,5]. It is noted that, in some embodiments, the granularity error may be based on the network defined accuracy requirements.

Figure 8A:
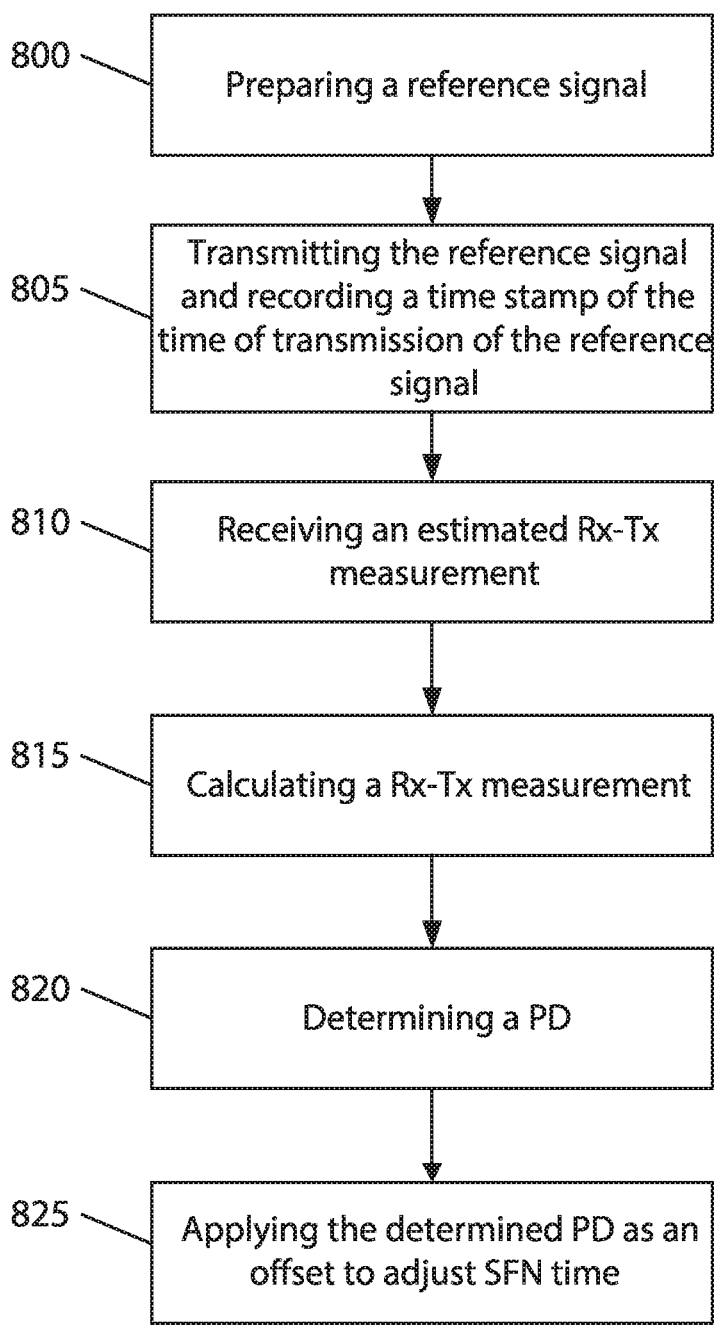
FIG. 8A illustrates an example flow diagram of a method, according to an embodiment.

FIG. 8A illustrates an example flow diagram of a method for Rx-Tx RTT measurement or estimation and PD compensation, according to one embodiment. In certain example embodiments, the flow diagram of FIG. 8A may be performed by a network entity or network node in a communications system, such as LTE or 5G NR. In some example embodiments, the network entity performing the method of FIG. 8A may include or be included in a base station, access node, node B, eNB, gNB, NG-RAN node, transmission-reception points (TRPs), high altitude platform stations (HAPS), relay station or the like. In other example embodiments, the network entity performing the method of FIG. 8A may include or be included in a UE, SL UE, relay UE, mobile station, mobile device, stationary device, a wireless transmit/receive unit, IoT device or sensor, or the like.

As illustrated in the example of FIG. 8A, the method may include, at 800, preparing a signal, such as, but not limited to, a reference signal, a positioning reference signal (PRS), primary synchronization signal (PSS), secondary synchronization signal (SSS), channel state information reference signal (CSI-RS), demodulation reference signal (DM-RS) or sidelink signals. In an embodiment, the method may include, at 805, transmitting the signal to another network element, such as a UE, and recording a time stamp (t0) of a time of transmission of the signal.

According to an embodiment, the method may include, at 810, receiving an estimated Rx-Tx measurement from the other network element and recording a time stamp (t3) of a time of receipt of the estimated Rx-Tx measurement. In one example, the estimated Rx-Tx measurement may be received on a shared channel such as for example, physical uplink shared channel (PUSCH) with a demodulation reference signal (DM-RS). The method may then include, at 815, calculating a Rx-Tx measurement based on a difference between the time stamp (t0) of the time of transmission of the signal and the time stamp (t3) of the receipt of the estimated Rx-Tx measurement from the other network element.

In some embodiments, the receiving 810 may include receiving a difference or delta between the estimated Rx-Tx measurement and a previous Rx-Tx measurement on the shared channel such as for example, physical uplink shared channel (PUSCH), from the other network element. According to another embodiment, the receiving 810 may include receiving an intra-symbol offset on the shared channel such as for example, physical uplink shared channel (PUSCH), from the other network element. In another embodiment, the receiving 810 may include receiving a difference or delta in the estimated Rx-Tx measurement or receiving an intra-symbol offset using a reference signal such as for example, a demodulation reference signal (DM-RS).

According to certain embodiments, the method may include, at 820, determining a propagation delay based on at least a difference between the received estimated Rx-Tx measurement and the calculated Rx-Tx measurement. In one embodiment, the determining 820 may include determining the propagation delay as half of the difference between the received estimated Rx-Tx measurement and the calculated Rx-Tx measurement. In an embodiment, the method may include, at 825, applying the determined propagation delay as an offset to adjust the SFN boundary timestamp at the network element.

Figure 8B:
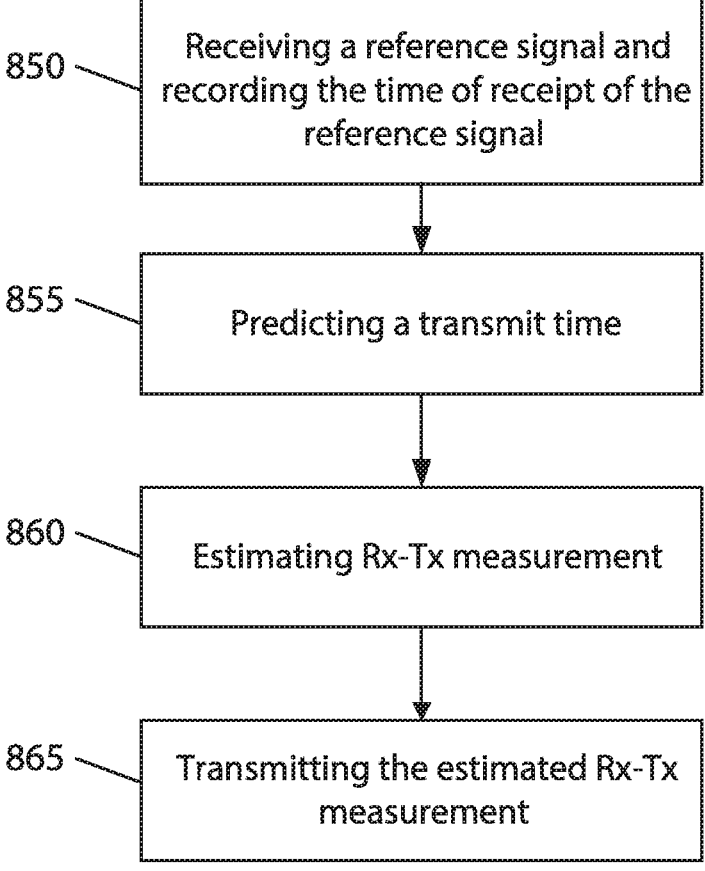
FIG. 8B illustrates another example flow diagram of a method, according to an embodiment.

FIG. 8B illustrates an example flow diagram of a method for Rx-Tx RTT measurement or estimation, according to one embodiment. In certain example embodiments, the flow diagram of FIG. 8B may be performed by a network entity or network node in a communications system, such as LTE or 5G NR. In some example embodiments, the network entity performing the method of FIG. 8B may include or be included in a UE, SL UE, relay UE, mobile station, mobile device, stationary device, a wireless transmit/receive unit, IoT device or sensor, or the like. In other example embodiments, the network entity performing the method of FIG. 8B may include or be included in a base station, access node, node B, eNB, gNB, NG-RAN node, transmission-reception points (TRPs), high altitude platform stations (HAPS), relay station or the like.

As illustrated in the example of FIG. 8B, the method may include, at 850, receiving a signal from another network element and recording a time of receipt (t1) of the reference signal. For example, the signal may include a reference signal, a PRS, PSS, SSS, CSI-RS, or DM-RS or sidelink signals. The method may also include, at 855, predicting a transmit time based on at least one of allocated resources, applied difference between downlink to uplink transmission timing, or internal errors at the network element. In an embodiment, the method may include, at 860, estimating Rx-Tx measurement based on a difference between the time of receipt and the predicted transmit time. The method may then include, at 865, transmitting the estimated Rx-Tx measurement to the other network element. The estimated Rx-Tx measurement may be transmitted on a shared channel such as for example, PUSCH with a DM-RS, for example. In some embodiments, the transmitting 865 may include transmitting a difference or delta in the estimated Rx-Tx measurement or transmitting an intra-symbol offset using a reference signal such as for example, DM-RS.

According to certain embodiments, the method may include calculating a difference in estimated Rx-Tx measurements and tracking a delta Rx-Tx measurement and, when a change in the estimated Rx-Tx measurements is above a range or threshold of the delta Rx-Tx measurement, transmitting the difference or delta in the estimated Rx-Tx measurement on a shared channel such as for example, PUSCH, to the other network element. For example, the range or threshold may be indicated by the network or may be a pre-configured value.

In some embodiments, the method may include transmitting an intra-symbol offset on the shared channel such as for example, PUSCH, to the other network element. According to a further embodiment, the method may include measuring an actual value of Rx-Tx based on actual transmission of the shared channel. In this embodiment, the method may then include determining if there is an error between the actual Rx-Tx measurement and the estimated Rx-Tx measurement and, when there is an error, transmitting a correction of the error to the other network element.

Figure 9:
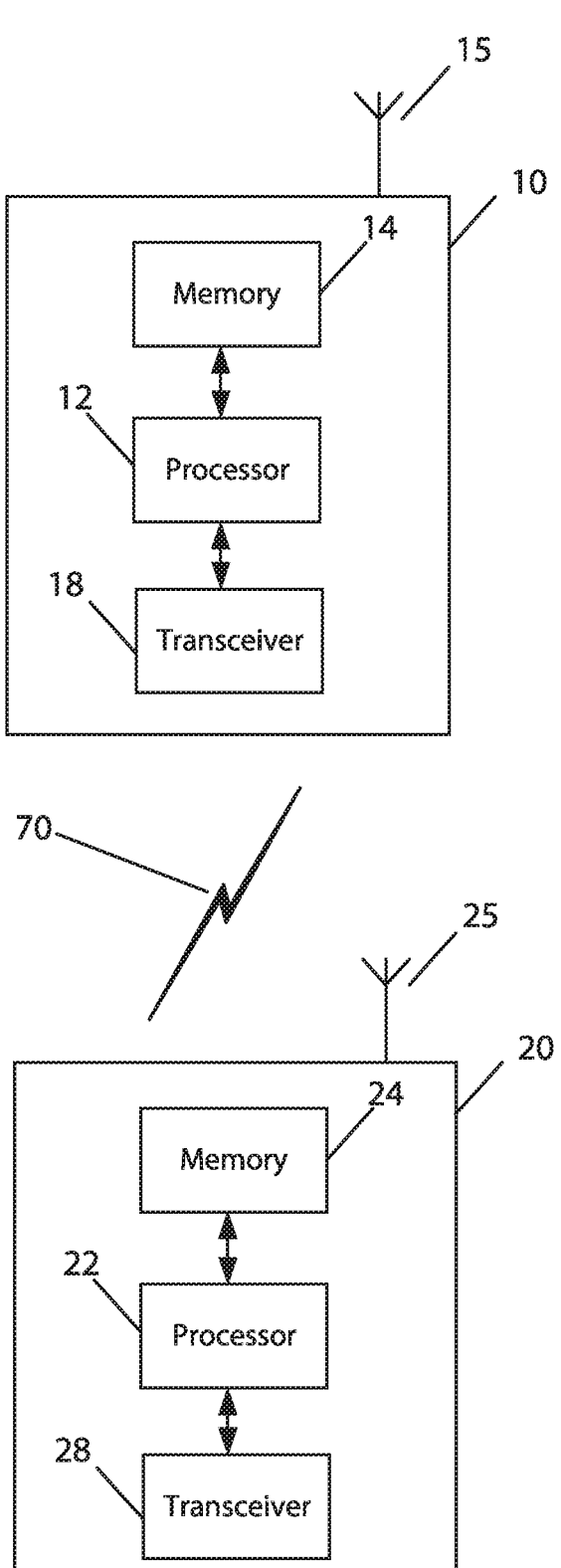
FIG. 9 illustrates an example block diagram of apparatuses, according to an embodiment.

FIG. 9 illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9.

As illustrated in the example of FIG. 9, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 9, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB, such as the gNB illustrated in any of FIG. 1-4 or 7. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as that illustrated in FIGS. 8A or 8B or any other method described herein. In some embodiments, as discussed herein, apparatus 10 may be configured to perform a procedure relating to Rx-Tx RTT measurement or estimation, for example.

FIG. 9 further illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9.

As illustrated in the example of FIG. 9, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 8A or FIG. 8B or any other method described herein. For example, in an embodiment, apparatus 20 may be controlled to perform a process relating to relating to Rx-Tx RTT measurement or estimation.

In some embodiments, an apparatus (e.g., apparatus 10 and/or apparatus 20) may include means for performing a method or any of the variants discussed herein, such as, a method described with reference to one or more of FIGS. 2-5. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, an advantage provided by certain embodiments includes resource overhead reduction (due to using two signals in place of three). This may be particularly useful when the Rx-Tx RTT estimation procedure needs to run periodically for synchronization or positioning purposes, but certainly also for a multi-cell scenario where Rx-Tx measurements is needed towards multiple cells. Further, according to certain embodiments, the UE may save power as the procedure requires one less UL transmission and is faster to execute than the baseline Rx-Tx procedure. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:

at least one processor; and at least one non-transitory memory storing instructions that, when executed with the at least one processor, cause the apparatus at least to:

receive, at a network element, a signal from another network element and record a time of receipt (t1) of the signal;

predict, by the network element, a transmit time based on allocated resources, applied difference between downlink to uplink transmission timing, and internal errors at the network element;

estimate Rx-Tx measurement based on a difference between the time of receipt and the predicted transmit time;

transmit the estimated Rx-Tx measurement to said another network element on a shared channel;

calculate a difference in estimated Rx-Tx measurements and track a delta Rx-Tx measurement;

transmit, when a change in the estimated Rx-Tx measurements is above a range and threshold of the delta Rx-Tx measurement, the difference or delta in the estimated Rx-Tx measurement to said another network element;

transmit an intra-symbol offset on the shared channel to said another network element;

measure an actual value of Rx-Tx based on actual transmission of the shared channel;

determine whether there is an error between the actual Rx-Tx measurement and the estimated Rx-Tx measurement; and transmit, when there is an error, a correction of the error to said another network element, wherein the signal comprises one of a reference signal, positioning reference signal (PRS), primary synchronization signal (PSS), secondary synchronization signal (SSS), channel state information reference signal (CSI-RS), demodulation reference signal (DM-RS), or sidelink signal, and wherein the transmitting comprises transmitting a difference or delta in the estimated Rx-Tx measurement and transmitting an intra-symbol offset using a reference signal.

2. The apparatus of claim 1, wherein the network element comprises a user equipment (UE) and said another network element comprises a gNB.

3. The apparatus of claim 1, wherein the network element comprises a gNB and said another network element comprises a user equipment (UE).

*    *    *    *    *